(12) United States Patent
Moyer et al.

(10) Patent No.: US 7,759,918 B2
(45) Date of Patent: Jul. 20, 2010

(54) METHOD FOR INHIBITING THERMAL RUN-AWAY

(75) Inventors: Ole P. Moyer, Chandler, AZ (US);
Christopher J. Gass, Tempe, AZ (US);
Paul J. Harriman, Goodyear, AZ (US);
Benjamin M. Rice, Attleboro, MA (US);
Michael A. Stapleton, Scottsdale, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/424,844

(22) Filed: Jun. 16, 2006

(65) Prior Publication Data

US 2007/0290664 A1 Dec. 20, 2007

(51) Int. Cl.
G05F 1/59 (2006.01)
G05F 1/565 (2006.01)
(52) U.S. Cl. .................................. 323/272; 323/284
(58) Field of Classification Search ................ 323/225, 323/268, 271, 272, 282, 283, 284, 285
See application file for complete search history.

(56) References Cited

U.S. PATENT DOCUMENTS

| 6,278,263 | B1 | 8/2001 | Walters et al. | 323/272 |
|---|---|---|---|---|
| 6,670,794 | B1 * | 12/2003 | Wang et al. | 323/213 |
| 6,965,502 | B2 | 11/2005 | Duffy et al. | 361/18 |
| 7,023,188 | B1 | 4/2006 | Rice | 323/271 |
| 7,031,174 | B2 | 4/2006 | Lipcsei | 363/98 |
| 7,161,337 | B2 * | 1/2007 | Nishimori | 323/271 |
| 7,227,476 | B1 * | 6/2007 | Wong | 341/53 |
| 7,414,383 | B2 * | 8/2008 | Burton et al. | 323/271 |
| 7,417,509 | B2 * | 8/2008 | Kultgen | 331/16 |
| 2003/0201761 | A1 | 10/2003 | Harris | 323/272 |
| 2005/0184717 | A1 | 8/2005 | Walters | 323/284 |

OTHER PUBLICATIONS

2/3/4 Phase Buck Controller for VR10 and VR11 Pentium IV Processor Applications, Semiconductor Components Industries, LLC, Publication No. NCP5381, Rev. 2, May 2006. Retrieved from http://www.onsemi.com/pub/Collateral/NCP5381-D.PDF.

MOSFET Driver with Dual Outputs for Synchronous Buck Converters, Semiconductor Components Industries, LLC, Publication No. NCP3418B, Rev. 5, Mar. 2006. Retrieved from http://www.onsemi.com/pub/Collateral/NCP3418B-D.PDF.

(Continued)

Primary Examiner—Gary L Laxton
(74) Attorney, Agent, or Firm—Rennie W. Dover

(57) ABSTRACT

A method for method for inhibiting thermal run-away in a multi-phase power converter at varying load transition rates. A multi-phase power converter having an on-time is provided and the frequency of the multi-phase power converter is adjusted so that a load step period and the on time of the multi-phase power converter are in a temporal relationship. Alternatively, a load step rate is inhibited from locking onto a phase current of the multi-phase power converter by suspending an oscillator signal. In accordance with another alternative, a load step rate is inhibited from locking onto a phase current of the multi-phase power converter by suspending an oscillator signal and dithering an input signal to the oscillator.

18 Claims, 5 Drawing Sheets

OTHER PUBLICATIONS

Dual Bootstrapped 12 V MOSFET Driver with Output Disable, Semiconductor Components Industries, LLC, Publication No. NCP3418, Rev. 12, May 2006. Retrieved from http://www.onsemi.com/pub/Collateral/NCP3418-D.PDF.

Dawson, Stephen, "What is Dither?" Ver. 21, Aug. 2003. Retrieved from http://www.hifi-writer.com/he/dydaudio/dither.htm.

* cited by examiner

METHOD FOR INHIBITING THERMAL RUN-AWAY

FIELD OF THE INVENTION

This invention relates, in general, to power converters and, more particularly, to multi-phase power converters.

BACKGROUND OF THE INVENTION

Power converters are used in a variety of electronic products including automotive, aviation, telecommunications, and consumer electronics. Power converters such as Direct Current to Direct Current ("DC-DC") converters have become widely used in portable electronic products such as laptop computers, personal digital assistants, pagers, cellular phones, etc., which are typically powered by batteries. DC-DC converters are capable of delivering multiple voltages from a single voltage independent of the load current being drawn from the converter or from any changes in the power supply feeding the converter. One type of DC-DC converter that is used in portable electronic applications is a buck converter. This converter, also referred to as a switched mode power supply, is capable of switching an input voltage from one voltage level to a lower voltage level. A buck converter is typically controlled by a controller that can be configured to be a multi-phase controller having a plurality of output current channels that switch at different times. The output currents flowing in the output current channels are summed and delivered to the load. An advantage of this configuration is that each channel conducts a portion of the total load current. For example, in a 4-phase buck controller, each channel conducts 25% of the output current. This lowers the power dissipated by each output. A drawback with a multi-phase buck controller is that when the currents are not balanced, one of the current channels will conduct more current than the other current channels, which could lead to thermal failure. Another drawback is that a dynamic load coupled to the controller may have the same repetition rate as one of the outputs of the multi-phase buck converter. In this case, the currents in the channels become unbalanced causing the converter to suffer thermal failure.

Hence, a need exists for a multi-phase controller circuit and a method of operating the multi-phase controller circuit that maintains a balanced current at its outputs. In addition, it is desirable for the multi-phase controller circuit to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements, and in which.

DETAILED DESCRIPTION

Generally, the present invention provides a method for balancing current in a multi-phase power converter at varying load transition rates. The multi-phase power converter comprises an oscillator or other ramp signal generator, a pulse width modulator, and at least one power stage. In accordance with one aspect of the present invention, the current is balanced by dithering an output signal of the oscillator or the ramp signal generator. It should be understood that dithering the output signal is defined as constantly varying the frequency of the oscillator output signal or the ramp signal. Dithering the oscillator output signal or the ramp signal keeps the load step rate and the switching frequency of the multi-phase power controller from matching for a significant period of time. Balancing the current inhibits thermal run-away in the multi-phase power converter.

In accordance with another aspect of the present invention, the current is balanced by suspending the oscillator output signal. This introduces a phase delay in the output signals so that the output signals are not synchronized to the load step rate.

In accordance with yet another aspect of the present invention, the current is balanced by dithering the oscillator output signal or the ramp signal and suspending the oscillator output signal.

Figure 1:
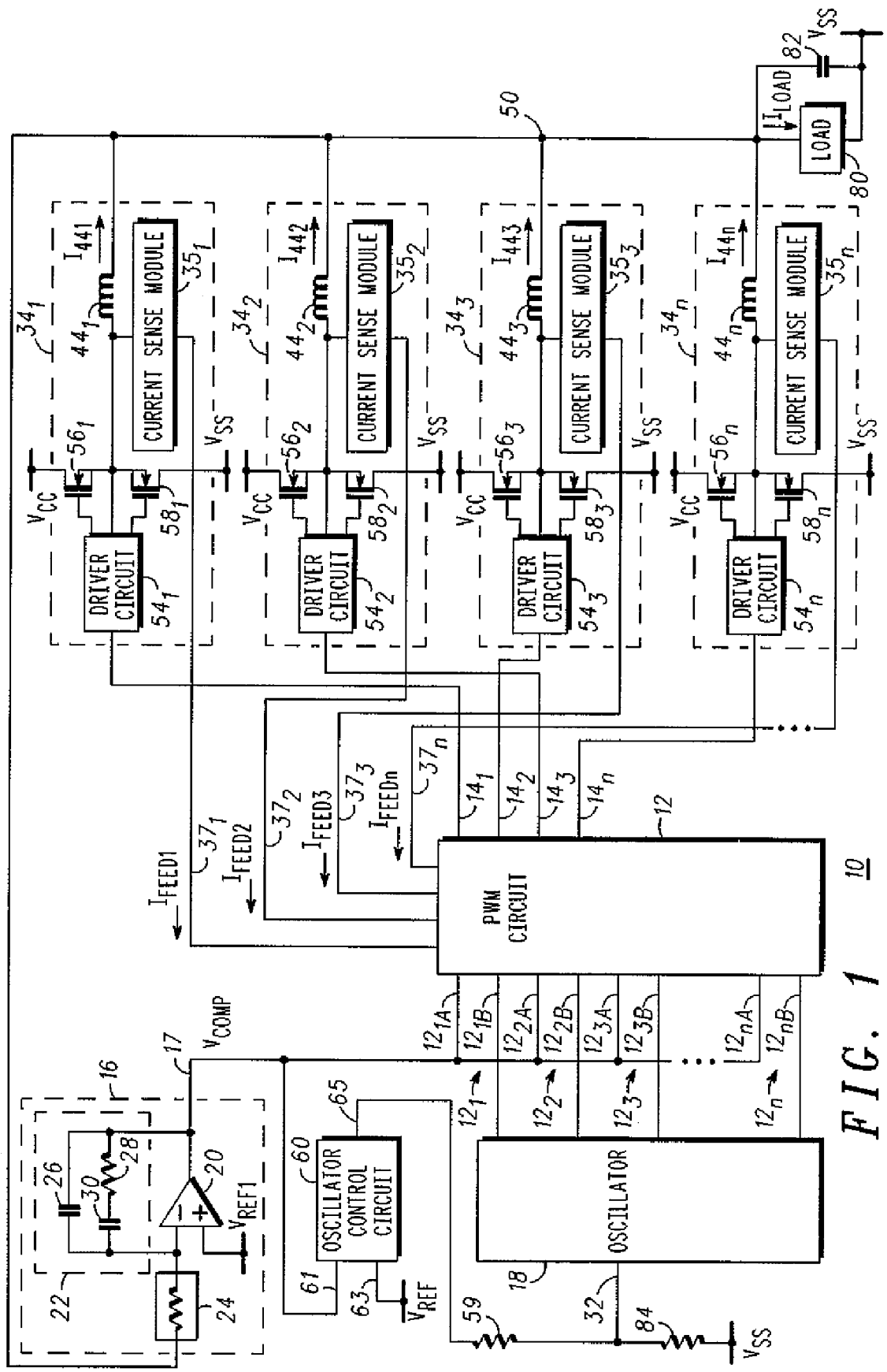
FIG. 1 is schematic diagram of a multi-phase controller circuit in accordance with an embodiment of the present invention.

FIG. 1 is a block diagram of a multi-phase power converter 10 manufactured in a semiconductor substrate in accordance with an embodiment of the present invention. What is shown in FIG. 1 is a Pulse Width Modulator ("PWM") circuit 12 having "n" sets of inputs $12_1$, $12_2$, $12_3$, ..., $12_n$, where "n" is an integer. Each set of the "n" sets of inputs comprises an error input $12_{nA}$ and an oscillation input $12_{nB}$. It should be noted that the letters "A" and "B" are used in the reference characters to distinguish between error inputs and oscillation inputs, respectively. Thus, input $12_1$ comprises an error input $12_{1A}$ and an oscillation input $12_{1B}$; input $12_2$ comprises an error input $12_{2A}$ and an oscillation input $12_{2B}$; input $12_3$ comprises an error input $12_{3A}$ and an oscillation input $12_{3B}$; and input $12_n$ comprises an error input $12_{nA}$ and an oscillation input $12_{nB}$.

Multi-phase power converter 10 further includes an error amplifier 16 having an output 17 connected to error inputs $12_{1A}$, $12_{2A}$, $12_{3A}$, ..., $12_{nA}$ and an oscillator 18 having an input 32 and a plurality of outputs, wherein the plurality of outputs are connected to corresponding oscillation inputs $12_{1B}$, $12_{2B}$, $12_{3B}$, ..., $12_{nB}$. In accordance with one embodiment, error amplifier 16 comprises an operational amplifier 20 connected in a negative feedback configuration in which an impedance 22 is coupled between the output of operational amplifier 20 and its inverting input and an impedance 24 is connected to the inverting input of operational amplifier 20. By way of example, impedance 22 comprises a capacitor 26 coupled in parallel with a series connected resistor 28 and capacitor 30, and impedance 24 comprises a resistor. The non-inverting input of operational amplifier 20 is coupled for receiving a reference voltage level $V_{REF1}$. It should be understood that the feedback configuration of error amplifier 16 is not a limitation of the present invention and that it may be realized using other feedback configurations known to those skilled in the art.

Outputs $14_1$, $14_2$, $14_3$, ..., $14_n$ of PWM circuit 12 are connected to corresponding inputs of power stages $34_1$, $34_2$, $34_3, \ldots, 34_n$, respectively. One output of power stage $34_1$ is connected to an output node 50. Similarly, outputs of power stages $34_2, 34_3, \ldots, 34_n$ are connected to output node 50. Power stages $34_1, 34_2, 34_3, \ldots, 34_n$, have current sense modules $35_1, 35_2, 35_3, \ldots, 35_n$, respectively, that generate feedback currents $I_{FEED1}, I_{FEED2}, I_{FEED3}, \ldots, I_{FEEDn}$ that are proportional to the currents flowing through energy storage elements $44_1, 44_2, 44_3, \ldots, 44_n$. Feedback current signals $I_{FEED1}, I_{FEED2}, I_{FEED3}, \ldots, I_{FEEDn}$, are fed back to PWM circuit 12 through feedback interconnects $37_1, 37_2, 37_3, \ldots, 37_n$, respectively. Circuit configurations for current sense modules are known to those skilled in the art.

Power stages $34_1, 34_2, 34_3, \ldots, 34_n$, comprise driver circuits $54_1, 54_2, 54_3, \ldots, 54_n$, respectively, having inputs that serve as the inputs of power stage $34_1, 34_2, 34_3, \ldots, 34_n$, high-side driver outputs connected to the gates of the respective switching transistors $56_1, 56_2, 56_3, \ldots, 56_n$, and low-side driver outputs connected to the gates of the respective switching transistors $58_1, 58_2, 58_3, \ldots, 58_n$. The drains of high-side switching transistors $56_1, 56_2, 56_3, \ldots, 56_n$ are coupled for receiving a source of operating potential such as, for example, $V_{CC}$, and the sources of high-side switching transistors $56_1, 56_2, 56_3, \ldots, 56_n$ are connected to the respective drains of low-side switching transistors $58_1, 58_2, 58_3, \ldots, 58_n$. The sources of low-side switching transistors $58_1, 58_2, 58_3, \ldots, 58_n$ are coupled for receiving a source of operating potential such as, for example, $V_{SS}$. The commonly connected sources and drains of transistors $56_1, 56_2, 56_3, \ldots, 56_n$, and transistors $58_1, 58_2, 58_3, \ldots, 58_n$, respectively, are connected to a terminal of the respective energy storage elements $44_1, 44_2, 44_3, \ldots, 44_n$. The other terminals of energy storage elements $44_1, 44_2, 44_3, \ldots, 44_n$ serve as outputs of power stages $34_1, 34_2, 34_3, \ldots, 34_n$. By way of example, energy storage elements $44_1, 44_2, 44_3, \ldots, 44_n$ are inductors. It should be noted that for "n" equal to two, power converter 10 is a 2-phase power converter; for "n" equal to three, power converter 10 is a 3-phase power converter; for "n" equal to four, power converter 10 is a 4-phase power converter, etc.

Figure 2:
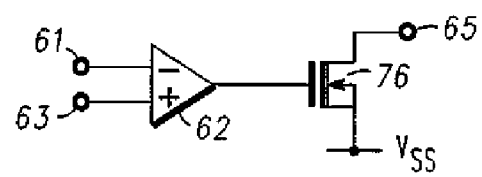
FIG. 2 is a schematic diagram of a portion of the multi-phase controller circuit of FIG. 1.

An oscillator control circuit 60 is coupled to input 32 of oscillator 18 via a resistor 59. More particularly, oscillator control circuit 60 has an input 61 connected to output 17 of error amplifier 16 for receiving compensation voltage $V_{COMP}$, an input 63 coupled for receiving a reference voltage $V_{REF2}$, and an output 65 connected to input 32 of oscillator 18. Briefly referring to FIG. 2, a schematic diagram of oscillator control circuit 60 in accordance with one embodiment of the present invention is illustrated. What is shown in FIG. 2 is a comparator 62 having an inverting input which serves as input 61 of oscillator control circuit 60, a non-inverting input which serves as input 63 of oscillator control circuit 60, and an output. Preferably, comparator 62 has hysteresis. The output of comparator 62 is connected to the gate of a Field Effect Transistor ("FET") 76. The source of FET 76 is coupled for receiving a source of operating potential such as, for example, $V_{SS}$, and the drain of FET 76 serves as an open drain output and as output 65 of oscillator control circuit 18.

A load 80 is coupled between output node 50 and a source of operating potential such as, for example, $V_{SS}$. An output capacitor 82 is connected in parallel with load 80. Output node 50 is connected in a feedback configuration to impedance 24.

In accordance with one embodiment, current imbalance and, therefore, thermal runaway is inhibited by adjusting the frequency of power converter 10 so that a load step period and the on-time of multi-phase power converter 10 are in a temporal relationship. It should be understood that the on-time of multi-phase power converter 10 is the time during which one or more of high side switching transistors $56_1$-$56_n$ is on. The temporal relationship is such that the load step period and the on-time of multi-phase power converter 10 is not coincident, the same, or similar with the load step current for an extended period of time. This is accomplished by programming oscillator 18 to generate a plurality of oscillator output signals having predetermined frequency and phase relationships. In accordance with one embodiment, power converter 10 is a 4-phase power converter, i.e., variable "n" is equal to 4, and oscillator 18 generates four triangular waveforms that are separated by 90 angular degrees. Oscillator 18 may be programmed by coupling a resistor 84 between input 32 of oscillator 18 and a source of operating potential, such as, for example, $V_{SS}$. The structure for controlling the output frequency of oscillator 18 is not limited to being a resistor. Other circuit networks can be coupled to input 32. For example, a resistor divider network may be coupled to input 32. Oscillator 18 transmits the oscillator output signals to inputs $12_{1B}, 12_{2B}, 12_{3B}, \ldots, 12_{nB}$ of PWM circuit 12. It should be noted that when power converter 10 is a 2-phase power converter, oscillator 18 generates two triangular waveforms that are separated by 180 degrees; when power converter 10 is a 3-phase power converter, oscillator 18 generates three triangular waveforms that are separated by 120 degrees, when power converter 10 is an n-phase power converter, oscillator 18 generates "n" triangular waveforms that are separated by 360/n degrees. As discussed hereinbefore, power converter 10 can be a 2-phase power converter, a 3-phase power converter, a 4-phase power converter, a 5-phase power converter, etc. It should be further noted that the oscillator output signal is also referred to as a ramp signal.

In addition, error amplifier 16 transmits a compensation signal, $V_{COMP}$, to inputs $12_{1A}, 12_{2A}, 12_{3A}, \ldots, 12_{nA}$ of PWM circuit 12. Compensation signal $V_{COMP}$ is also referred to as an error signal $V_{ERROR}$ and appears at output 17 of error amplifier 16.

Figure 3:
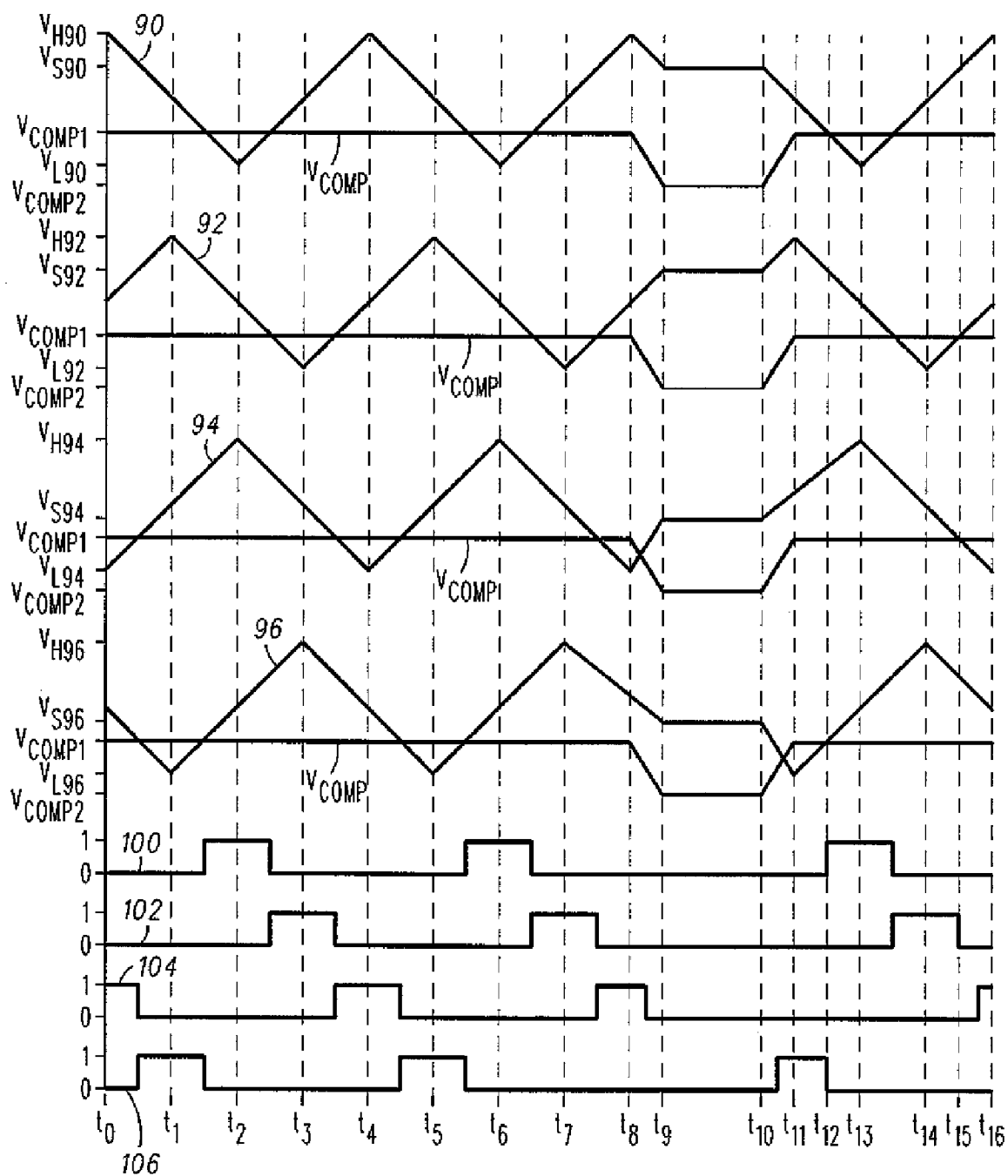
FIG. 3 is a timing diagram of the operation of the multi-phase controller circuit of FIG. 1.

Referring now to FIG. 3, a timing diagram illustrating the triangular waveforms or ramp signals generated by oscillator 18 for a 4-phase power converter is illustrated. What is shown in FIG. 3 is a triangular waveform 90 having an amplitude ranging from voltage level $V_{L90}$ to voltage level $V_{H90}$, a triangular waveform 92 having an amplitude ranging from voltage level $V_{L92}$ to voltage level $V_{H92}$, a triangular waveform 94 having an amplitude ranging from voltage level $V_{L94}$ to voltage level $V_{H94}$, and a triangular waveform 96 having an amplitude ranging from voltage level $V_{L96}$ to voltage level $V_{H96}$. Triangular waveforms 90 and 92 have phase angles that are separated by 90 angular degrees; triangular waveforms 92 and 94 have phase angles that are separated by 90 angular degrees; triangular waveforms 94 and 96 have phase angles that are separated by 90 angular degrees; and triangular waveforms 96 and 90 have phase angles that are separated by 90 angular degrees. During times $t_0$ to $t_8$, waveform 90 leads waveform 92 by 90 degrees, waveform 90 leads waveform 94 by 180 degrees, waveform 90 leads waveform 96 by 270 degrees, and compensation voltage $V_{COMP}$ has a substantially constant voltage value of $V_{COMP1}$. It should be noted that waveforms 90-96 have been shown as separate plots for the sake of clarity and that voltage level $V_{COMP1}$ is the same voltage level for each of the plots for waveforms 90-96.

When waveform 90 has a voltage value greater than voltage $V_{COMP}$, signal 100 appearing output $14_1$ of PWM 12 has a logic low voltage level, i.e., a logic 0 level. When waveform 90 has a voltage value less than voltage $V_{COMP}$, signal 100 has a logic high voltage level, i.e., a logic 1 level. Similarly, when waveforms 92-96 have voltage values greater than voltage $V_{COMP}$, signals 102-106 appearing at outputs $14_2$-$14_n$ of PWM 12, respectively, have logic low voltage levels, i.e., logic 0 levels, and when waveforms 92-96 have voltage values less than voltage $V_{COMP}$, signals 102-106 appearing at outputs $14_2$-$14_n$ of PWM 12, respectively, have logic high voltage levels, i.e., logic 1 levels. Thus, signals 102-106 are generated by comparing compensation signal $V_{COMP}$ with waveforms 90-96, respectively.

At time $t_8$, load current $I_{LOAD}$, decreases which increases voltage $V_{OUT}$ and causes voltage $V_{COMP}$ to decrease from a voltage level $V_{COMP1}$ to a voltage level $V_{COMP2}$. PWM outputs $14_1$-$14_n$ are held low, i.e., the corresponding pulse width modulator circuits of PWM 12 are off when voltage signal $V_{COMP}$ is at voltage level $V_{COMP2}$. Because the corresponding pulse width modulators are off, waveforms 90-96 become non-time varying and have voltage levels $V_{S90}$, $V_{S92}$, $V_{S94}$, and $V_{S96}$, respectively. Therefore oscillator output signals 90-96 are suspended. Thus, a phase shift angle is introduced into waveforms 90-96. In other words, the time during which they are suspended merely introduces a delay into waveforms 90-96. Thus, at time $t_8$ waveform 90 begins to decrease from voltage level $V_{H90}$. However, at time $t_9$, waveform 90 is suspended at a voltage level $V_{S90}$ and remains at this voltage level until time $t_{10}$ at which time it continues decreasing to voltage level $V_{L90}$. Similarly, at time $t_9$, waveform 92 is suspended at a voltage level $V_{S92}$ and remains at this voltage level until time $t_{10}$ at which time it continues increasing to voltage level $V_{H92}$; waveform 94 is suspended at a voltage level $V_{S94}$ and remains at this voltage level until time $t_{10}$ at which time it continues increasing to voltage level $V_{H94}$; and waveform 96 is suspended at a voltage level $V_{S96}$ and remains at this voltage level until time $t_{10}$ at which time it continues decreasing to voltage level $V_{L96}$. While waveforms 90-96 are suspended, PWM signals 100-106 have a zero duty cycle, i.e., they are at logic low or logic 0 voltage levels.

It should be noted that like voltage level $V_{COMP1}$, voltage level $V_{COMP2}$ is the same for each waveform 90-96. Voltage levels $V_{H90}$, $V_{H92}$, $V_{H94}$, and $V_{H96}$ may be the same and voltage levels $V_{L90}$, $V_{L92}$, $V_{L94}$, and $V_{L96}$ are the same.

At time $t_{10}$, output voltage $V_{OUT}$ begins to recover causing compensation voltage $V_{COMP}$ appearing at output 17 of error amplifier 16 to increase. At time $t_{11}$, output voltage level $V_{OUT}$ has recovered and compensation voltage $V_{COMP}$ appearing at output 17 of error amplifier 16 is at voltage level $V_{COMP1}$. Thus, waveforms 90-96 continue from where they were suspended. During the time period between times $t_{10}$ and $t_{15}$, signals 100-106 appearing at outputs $14_1$-$14_n$ of PWM 12 are at a logic low voltage level when waveforms 90-96 have voltage values greater than compensation $V_{COMP}$ and they are at a logic high voltage level when waveforms 90-96 have voltage values less than compensation voltage $V_{COMP}$.

Figure 4:
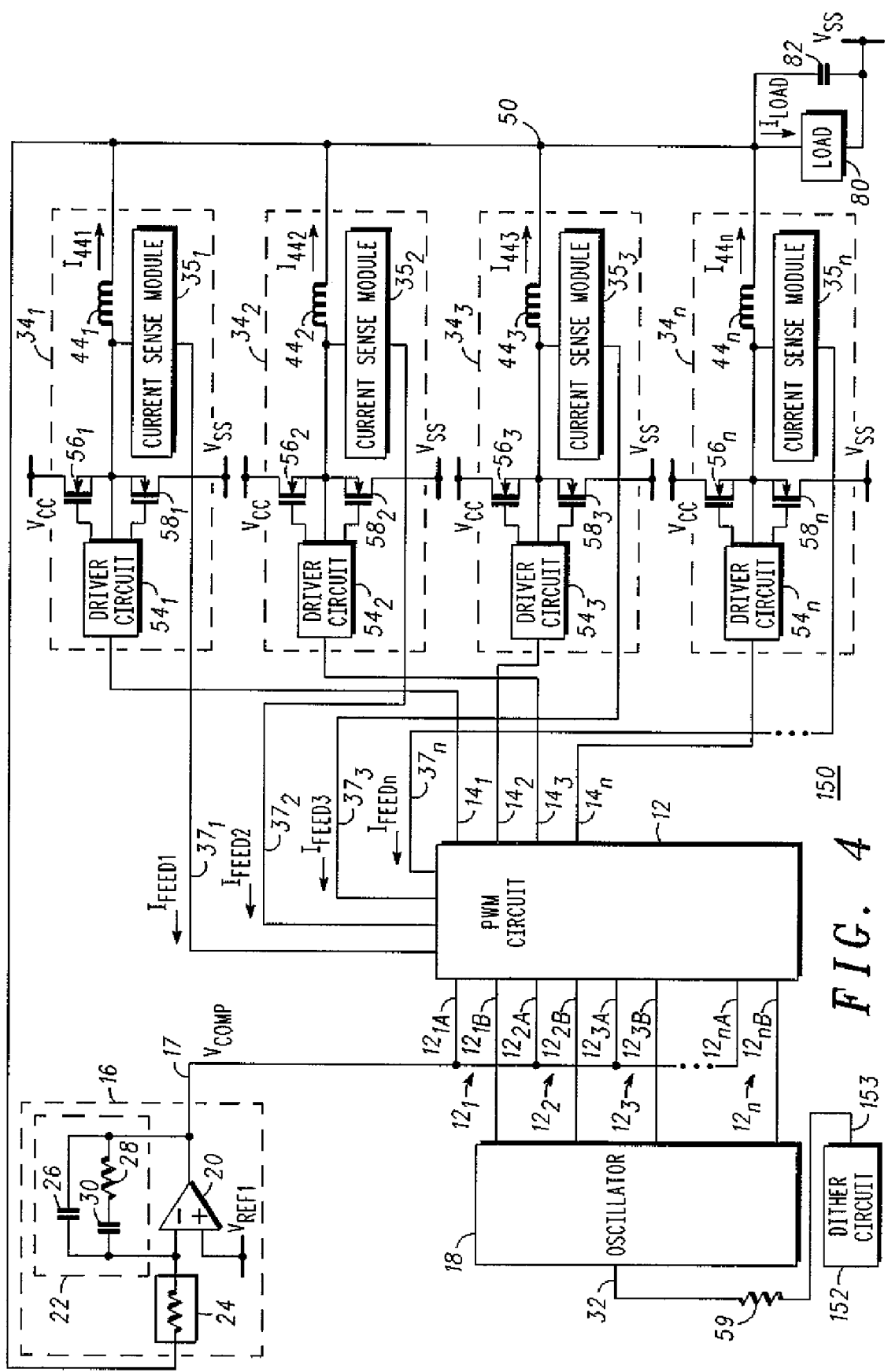
FIG. 4 is a schematic diagram of a multi-phase controller circuit in accordance with another embodiment of the present invention.

FIG. 4 is a block diagram of a multi-phase power converter 150 in accordance with another embodiment of the present invention. What is shown in FIG. 4 is PWM circuit 12, error amplifier 16, oscillator 18, power stages $34_1$-$34_n$, load 80, and load capacitor 82, which have been described with reference to FIG. 2. Multi-phase power converter 150 further includes a dither network 152 having an output 153 coupled to input 32 of oscillator 18 via resistor 59.

Figure 5:
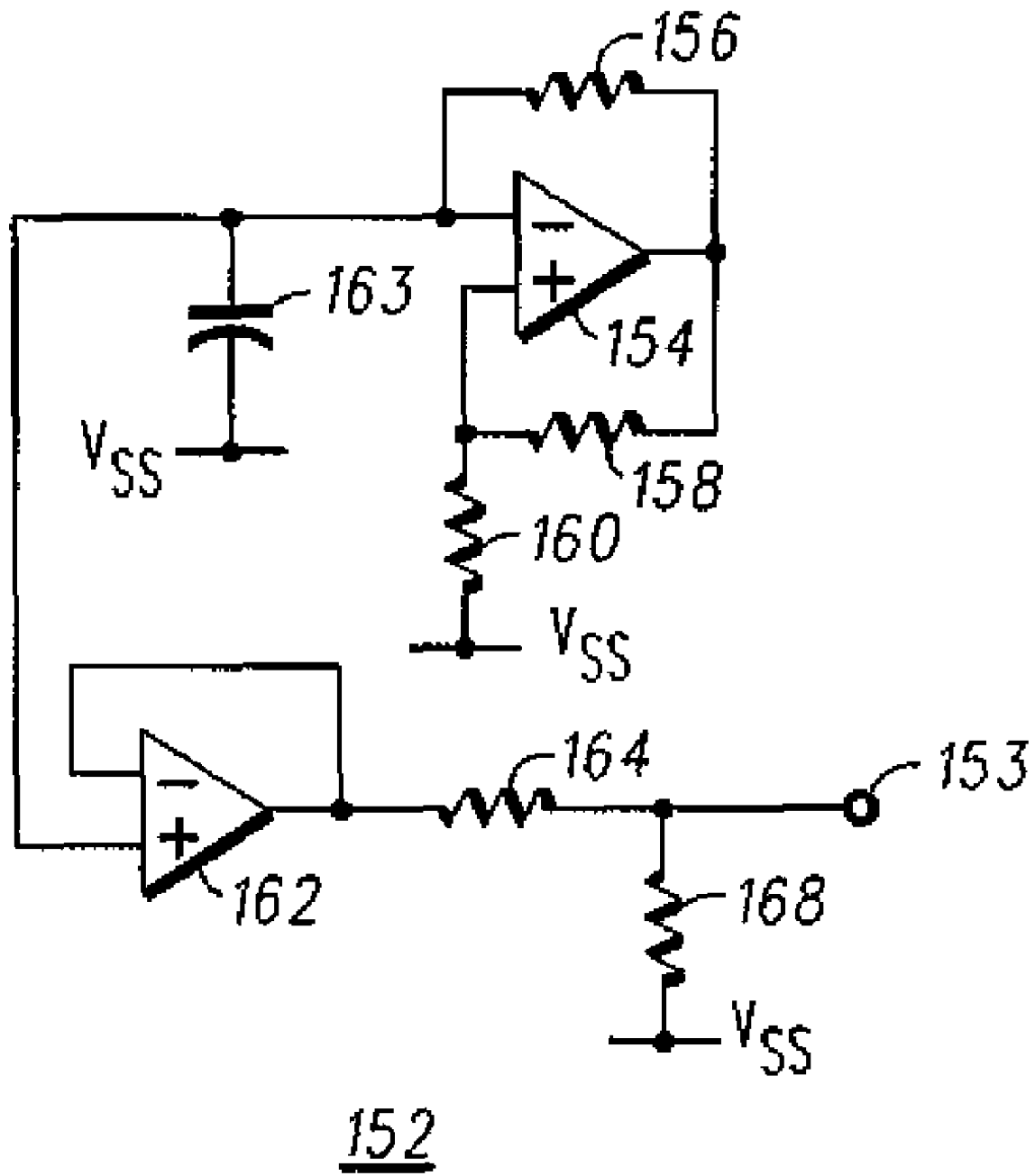
FIG. 5 is a schematic diagram of a portion of the multi-phase controller circuit of FIG. 4.

FIG. 5 is a block diagram of dither network 152 in accordance with an embodiment of the present invention. Dither network 152 may comprise operational amplifiers 154 and 162, wherein each operational amplifier has an inverting input, a non-inverting input, and an output. A resistor 156 is connected between the output of operational amplifier 154 and its inverting input and a resistor 158 is connected between the output of operational amplifier 154 and its non-inverting input. In addition, a resistor 160 is connected between the non-inverting input of operational amplifier 154 and a source of operating potential such as, for example, $V_{SS}$, and a capacitor 163 is connected between the inverting input of operational amplifier 154 and a source of operating potential such as, for example, $V_{SS}$. The non-inverting input of operational amplifier 162 is connected to the inverting input of operational amplifier 154 and the output of operational amplifier 162 is connected to its inverting input in a unity gain configuration. The output of operational amplifier 162 is also connected to output 153 through a resistor 164. Output 153 is coupled for receiving a source of operating potential such as, for example, $V_{SS}$, through a resistor 168.

In operation, dither circuit 152 changes the switching frequency of power stages $34_1$-$34_n$ to inhibit the load step rate and the switching frequency of switches $34_1$-$34_n$, from matching for a significant period of time. This prevents a build-up of an imbalance of current in the channels.

Figure 6:
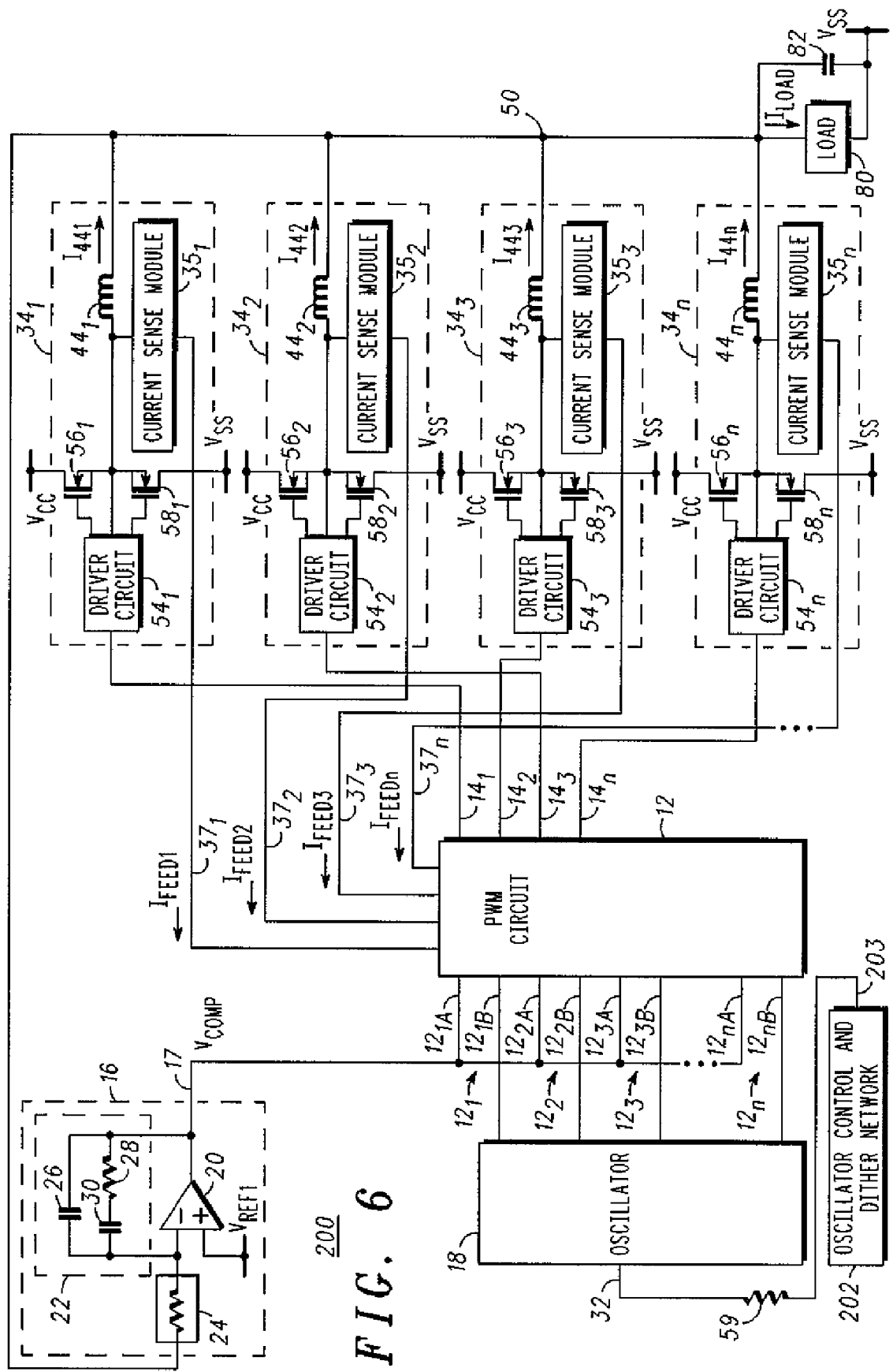
FIG. 6 is a schematic diagram of a multi-phase controller circuit in accordance with yet another embodiment of the present invention.

FIG. 6 is a block diagram of a multi-phase power converter 200 in accordance with another embodiment of the present invention. What is shown in FIG. 6 is PWM circuit 12, error amplifier 16, oscillator 18, power stages $34_1$-$34_n$, load 80, and load capacitor 82, which have been described with reference to FIGS. 2 and 4. Multi-phase power converter 200 further includes a oscillator control and dither network 202 having an output 203 coupled to input 32 of oscillator 18 through resistor 59.

In operation, oscillator control and dither network 202 changes the switching frequency of power stages $34_1$-$34_n$ and introduces a phase delay to inhibit the load step rate and the switching frequency of switches $34_1$-$34_n$, from matching for a significant period of time. This prevents a build-up of an imbalance of current in the channels, thereby inhibiting thermal runaway and thus thermal failure of multi-phase power converter 200.

By now it should be appreciated that a method of balancing current in a multi-phase power converter for inhibiting thermal run-away at varying load transition rates has been provided. In accordance with an embodiment of the present invention, thermal run-away is inhibited by adjusting the frequency or period of multi-phase power converter and a load step period such that they are not coincident, the same, or similar for an extended period of time. In accordance with another embodiment, thermal run-away is inhibited by dithering the switching frequency of power stages so that the load step rate and the switching frequency of the switches do not match for a significant period of time. An advantage of the present invention is that it is cost efficient to implement.

Although certain preferred embodiments and methods have been disclosed herein, it will be apparent from the foregoing disclosure to those skilled in the art that variations and modifications of such embodiments and methods may be made without departing from the spirit and scope of the invention. For example, the method can be implemented using a digital technique. It should be noted that the word "when" is taken to mean at the time an event occurs and while the event is occurring unless otherwise stated. It is intended that the invention shall be limited only to the extent required by the appended claims and the rules and principles of applicable law.

What is claimed is:

1. A method for inhibiting thermal run-away in a multi-phase power converter at varying load transition rates, comprising:

providing the multi-phase power converter comprising:
a Pulse Width Modulation circuit having a plurality of inputs and a plurality of outputs;

an error amplifier having an input and an output, the output coupled to a first input of the plurality of inputs;

an oscillator having an input and a plurality of outputs, a first output of the plurality of outputs coupled to a second input of the plurality of inputs of the Pulse Width Modulation circuit; and a first power stage having an input coupled to a first output of the plurality of outputs of the Pulse Width Modulation circuit; and operating the multi-phase power converter to inhibit a load step rate from locking onto a phase current of the multi-phase power converter by programming the oscillator to generate a plurality of output signals having predetermined frequency and phase relationships and to adjust an output frequency of the multi-phase power converter so that the load step period and the on-time of the multi-phase power converter are in a changing temporal relationship.

2. The method of claim 1, wherein operating the multi-phase power converter includes suspending an oscillator signal from the first output of the plurality of outputs of the oscillator.

3. The method of claim 1, wherein operating the multi-phase power converter includes dithering an output signal of the multi-phase power converter by dithering an input signal at the input to the oscillator.

4. The method of claim 3, wherein operating the multi-phase power converter further includes suspending an output signal at the first output of the plurality of outputs of the oscillator.

5. The method of claim 1, further including a multi-phase power converter selected from the group of multi-phase power converters comprising a 2-phase power converter, a 3-phase power converter, and a 4-phase power converter.

6. The method of claim 1, further including:
generating a circuit output voltage from a multi-phase power converter output voltage; and
generating a compensation voltage from the circuit output voltage.

7. The method of claim 6, further including comparing the compensation voltage with at least one oscillator signal to generate a pulse width modulated signal.

8. The method of claim 7, wherein comparing the compensation voltage with the at least one oscillator signal includes comparing the compensation voltage with a plurality of oscillator signals to generate a plurality of pulse width modulated signals.

9. The method of claim 1, wherein the oscillator further includes second, third, and fourth outputs of the plurality of outputs and further including generating first, second, third, and fourth output signals at the first, second, third, and fourth outputs of the plurality of outputs of the oscillator, wherein the first and second output signals have phase angles that are separated by ninety degrees, the second and third output signals have phase angles that are separated by ninety degrees, the third and fourth output signals have phase angles that are separated by ninety degrees, and the fourth and first output signals have phase angles that are separated by ninety degrees.

10. The method of claim 1, wherein the oscillator further includes second, third, and fourth outputs of the plurality of outputs and further including generating the first output signal to lead the second output signal by ninety degrees, generating the first output signal to lead the third output signal by one hundred eighty degrees, and generating the first output signal to lead the fourth output signal by two hundred seventy degrees.

11. The method of claim 1, wherein the output signal of the error amplifier appears at first, third, fifth, and seventh input terminals of the Pulse Width Modulation circuit.

12. The method of claim 11, further including decreasing the voltage at the first, third, fifth, and seventh input terminals in response to a decrease in a load current.

13. The method of claim 11, wherein the output signal of the error amplifier has a substantially constant value over a first time range.

14. The method of claim 13, wherein the output signal of the error amplifier has a substantially constant voltage over a second time range, wherein the substantially constant voltage over the second time range is less than the substantially constant voltage over the first time range.

15. The method of claim 13, further including generating an output signal at the first output of the Pulse Width Modulation circuit that is at a logic high voltage level in response to the voltage signal at the second input terminal of the Pulse Width Modulation circuit being greater than the voltage signal at the first input terminal of the Pulse Width Modulation circuit.

16. The method of 13, further including generating output signals at the second, third, and fourth outputs of the Pulse Width Modulation circuit that are at a logic low voltage level in response to the voltage signals at the fourth, sixth, and eighth input terminals of the Pulse Width Modulation circuit being greater that the voltage signals at the third, fifth, and seventh input terminals of the Pulse Width Modulation circuit.

17. A method for inhibiting thermal run-away in a multi-phase power converter at varying load transition rates, comprising:
providing the multi-phase power converter comprising:
a Pulse Width Modulation circuit having a plurality of inputs and a plurality of outputs;
an error amplifier having an input and an output, the output coupled to a first input of the plurality of inputs;
an oscillator having an input and a plurality of outputs, a first output of the plurality of outputs coupled to a second input of the plurality of inputs of the Pulse Width Modulation circuit; and
a first power stage having an input coupled to a first output of the plurality of outputs of the Pulse Width Modulation circuit; and
operating the multi-phase power converter to inhibit a load step rate from locking onto a phase current of the multi-phase power converter by dithering an output signal at the first output of the oscillator and suspending the dithered oscillator signal.

18. The method of claim 17, wherein the multi-phase power converter has n-phases where n is an integer.

* * * * *